Figure 1:
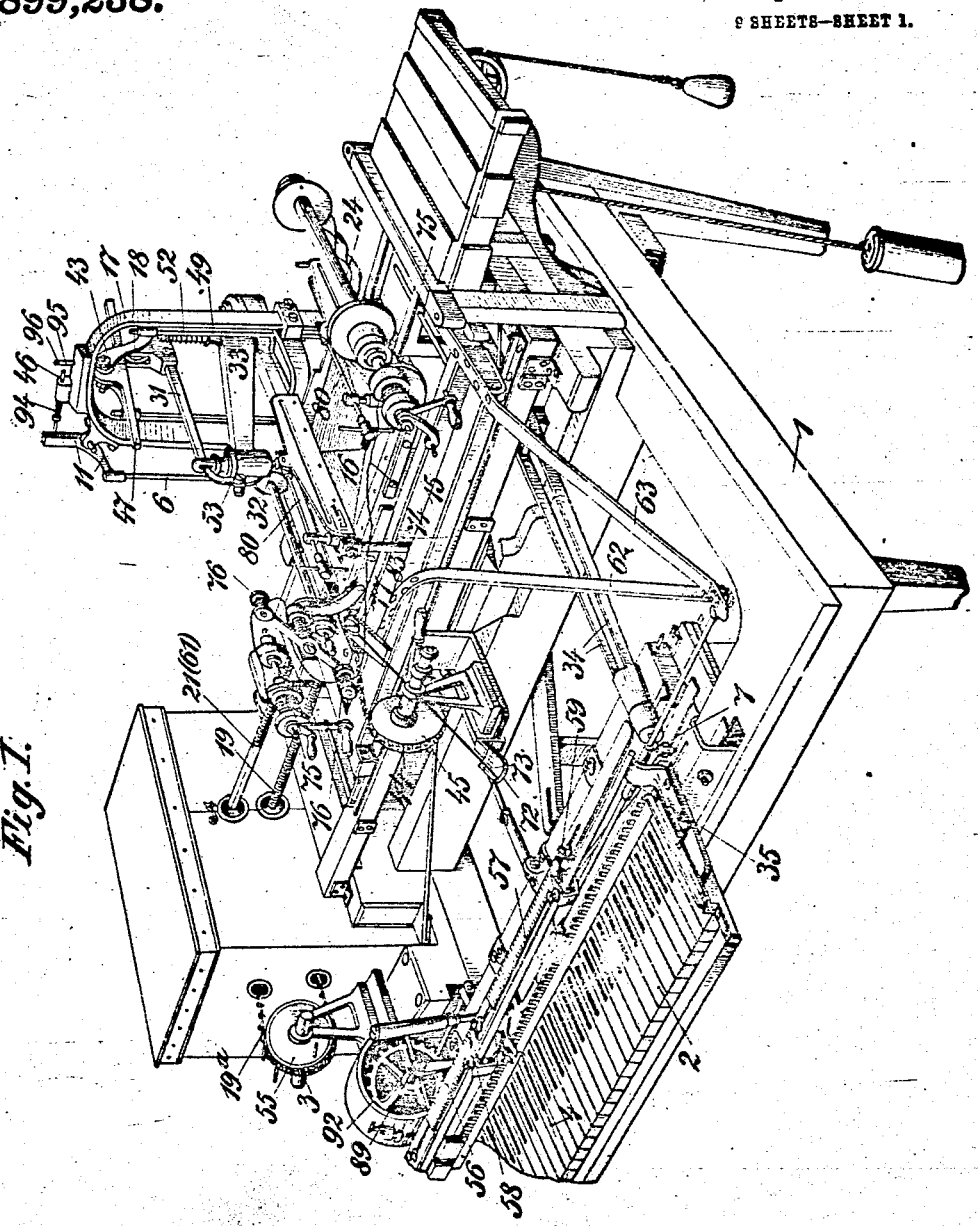

J. C. BUNGE.
APPARATUS FOR PUNCHING MUSIC STRIPS.
APPLICATION FILED DEC. 11, 1905.

899,238.

Patented Sept. 22, 1908.

9 SHEETS—SHEET 3.

Witnesses:
Inventor: Julius C. Bunge
by: Connolly Bros
Attorneys

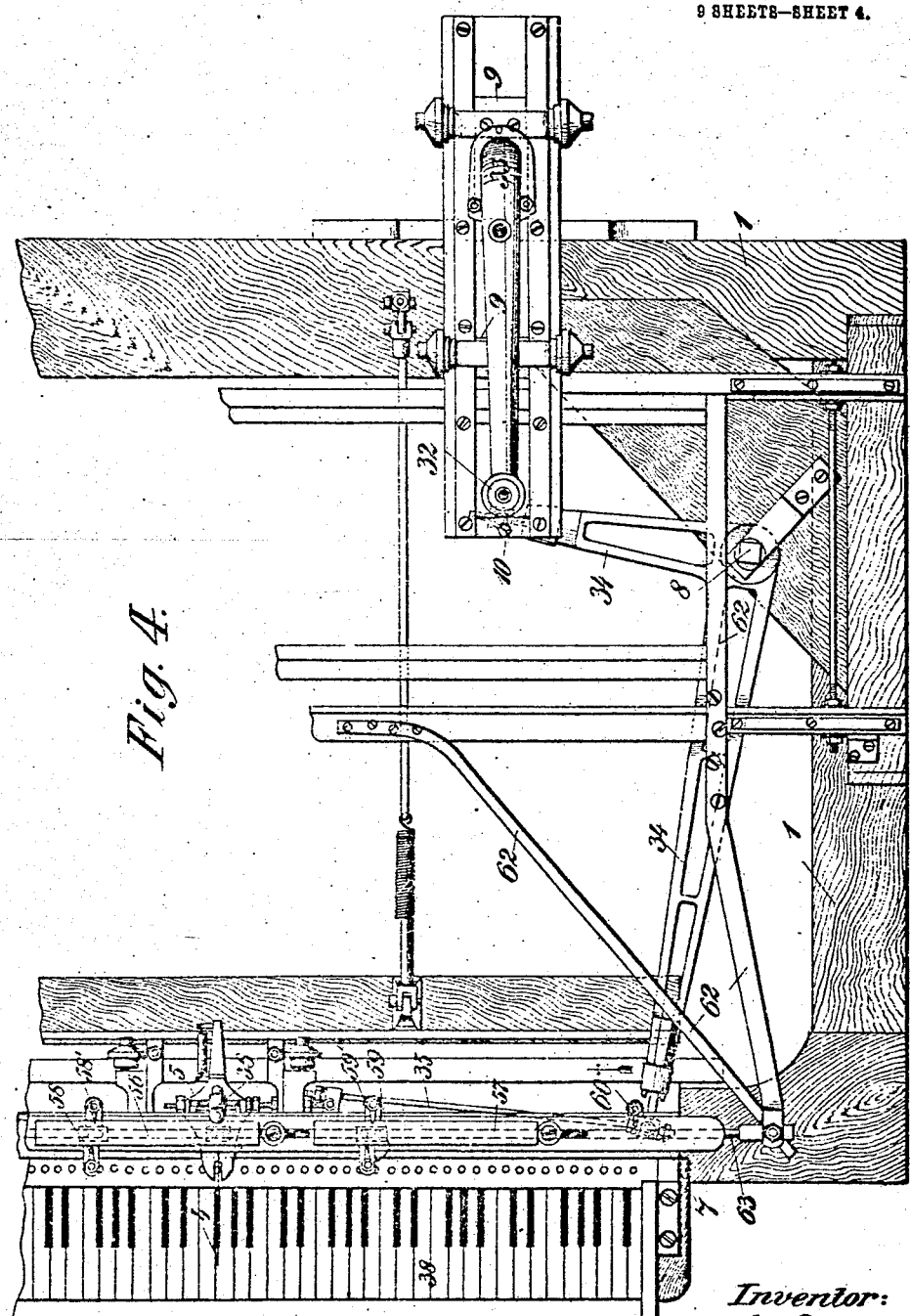

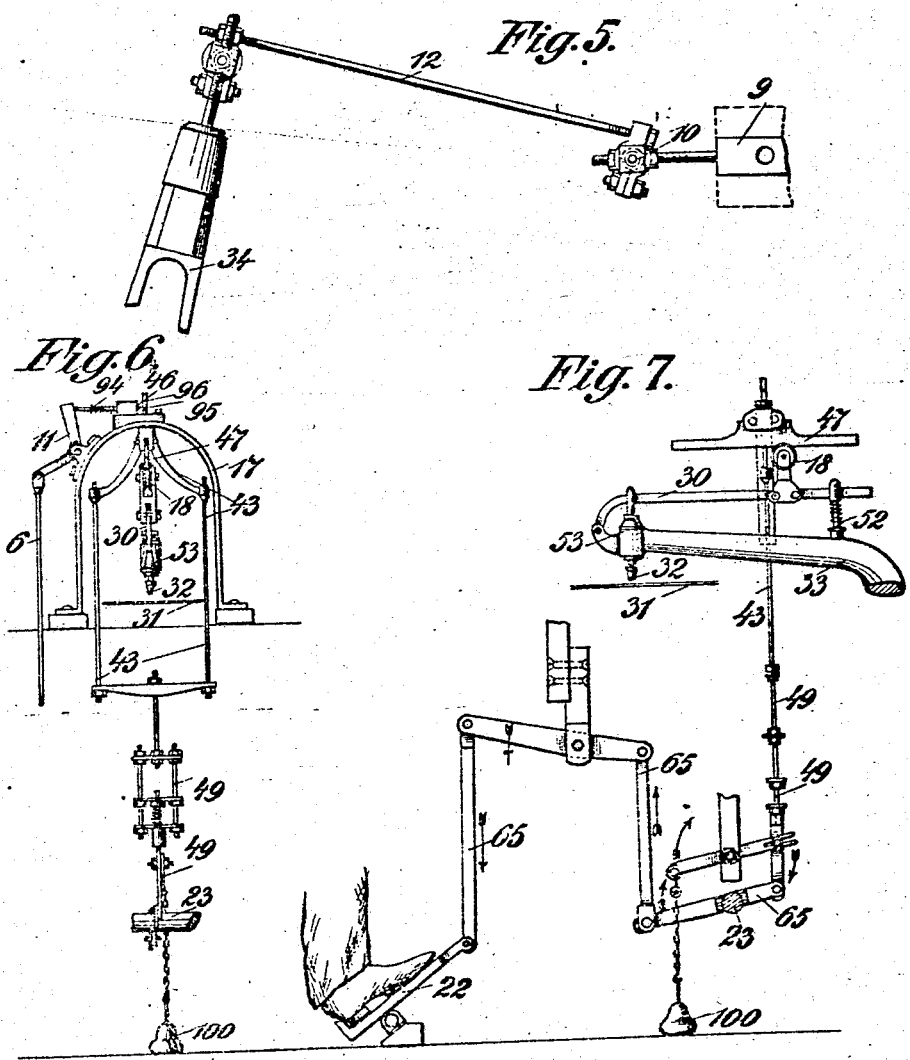

J. C. BUNGE.
APPARATUS FOR PUNCHING MUSIC STRIPS.
APPLICATION FILED DEC. 11, 1905.

899,238.

Patented Sept. 22, 1908.
9 SHEETS—SHEET 5.

Witnesses:
J. P. Hines.
Ch. Weikert.

Inventor:
Julius C. Bunge.
by: Connolly Bros
Attorneys

J. C. BUNGE.
APPARATUS FOR PUNCHING MUSIC STRIPS.
APPLICATION FILED DEC. 11, 1905.

899,238.
Patented Sept. 22, 1908.
9 SHEETS—SHEET 7.

Witnesses:

Inventor:
Julius C. Bunge
by Connolly Bros
Attorneys

J. C. BUNGE.
APPARATUS FOR PUNCHING MUSIC STRIPS.
APPLICATION FILED DEC. 11, 1905.
No. 99,238.
Patented Sept. 22, 1908.
9 SHEETS—SHEET 8.
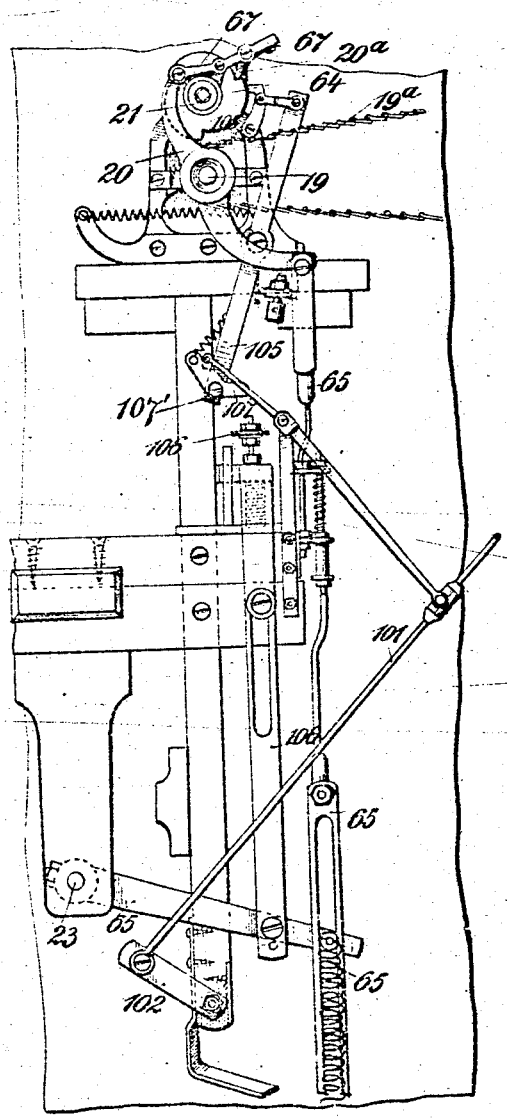
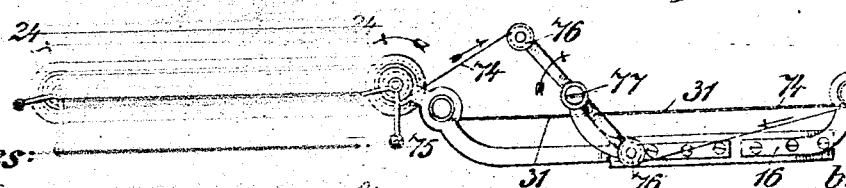

J. C. BUNGE.
APPARATUS FOR PUNCHING MUSIC STRIPS.
APPLICATION FILED DEC. 11, 1905.

899,238.

Patented Sept. 22, 1908.
9 SHEETS—SHEET 9.

Witnesses:
J. P. Hines.
C. B. Weikert.

Inventor:
Julius C. Bunge.
by: Connolly Bros
Attorneys

UNITED STATES PATENT OFFICE.

JULIUS CARL BUNGE, OF AMSTERDAM, NETHERLANDS.

APPARATUS FOR PUNCHING MUSIC-STRIPS.

No. 899,238.　　　　　Specification of Letters Patent.　　　Patented Sept. 22, 1908.

Application filed December 11, 1905. Serial No. 291,354.

*To all whom it may concern:*

Be it known that I, JULIUS CARL BUNGE, subject of the Queen of the Netherlands, residing at Amsterdam, Netherlands, have invented certain new and useful Improvements in Apparatus for Punching Music-Strips Suitable for Mechanical Pianoforte-Playing Instruments, of which the following is a specification.

This invention has reference to apparatus for punching the perforations in music sheets or rolls for mechanical musical instruments, such as the pianola, phonola, and the like, the invention relating more especially to that kind of punching machine in which the small pieces of paper corresponding to the individual sounds or notes are cut out by a punch moving up and down under which the paper band to be punched is intermittently moved in a longitudinal direction. The notes are therefore punched in the paper band not by punches intended for a definite size of note (punches for 1, ½, ¼ etc. notes) but by means of advancing the paper band or sheet of notes to be punched by jerks, in such a way that every time the punch goes up and down a piece corresponding to the diameter of the punch is punched out of the paper band, and in this manner a cut representing the respective note produced in the paper band. The punch may be either circular or angular; the round-shaped is the best.

In punching members of the kind described, the paper band advancing under a punch which moves up and down, the cuts representing the respective sounds or notes are produced in such a way for instance that the following circular cut at the same time cuts away a certain part of the previous circle adjoining it. In this manner a cut is produced whose opposite sides are indented. The same method of working is used in the present machine, but it is also possible to adjust the punching device in this machine in such a manner that the cut representing the value of a note is not a continuous cut, but consists of a certain number of perfect circles lying very close to one another, in which case the strength of the paper band is less impaired without the sound being unfavorably affected thereby.

The apparatus mainly consists of eight parts, namely:

1. The means for adjusting the punching device in its working position.

2. The device for actuating the punching knife.

3. The device for, immediately after the completion of each cut, adjusting the paper band to the proper position required in order to make the next incision.

4. The device for advancing the paper band by jerks during the punching process, so-called upper slide or "value" slide.

5. The device for returning into its zero position the upper slide or so-called "value" slide, which carries the paper, this return to the zero position taking place immediately after a cut representing the value of a note has been completely punched.

6. The device for maintaining the paper to be punched at its proper tension.

7. A device for pressing or securing the paper to be punched, this device being independent of the two slides, i. e., the upper or so-called "value" slide, and the lower or so-called "time" or measure slide.

8. A counting device actuated by the driving shaft for the purpose of ascertaining the number of perforations produced.

In the accompanying drawings the apparatus and its principal parts are represented.

Figure 2:
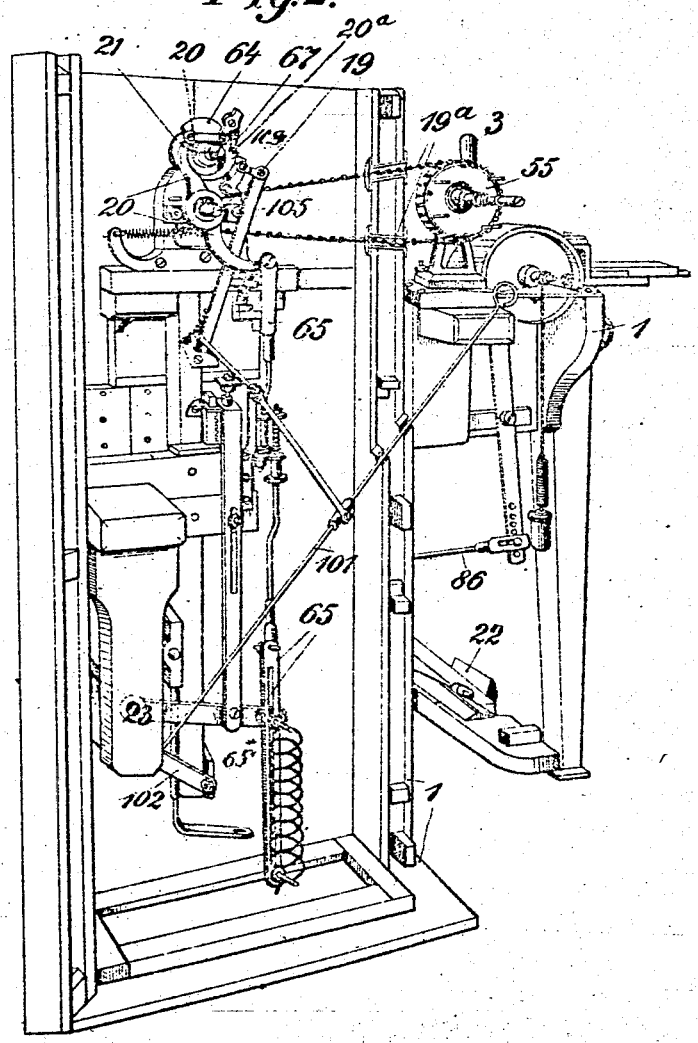
Figure 3:
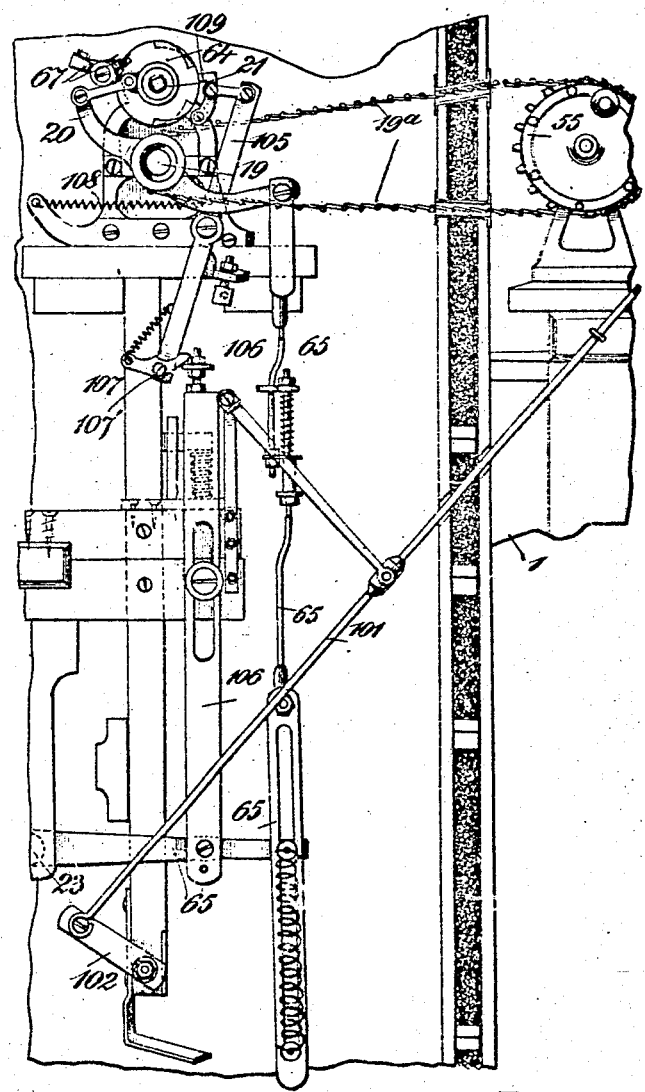
Figures 10, 11:
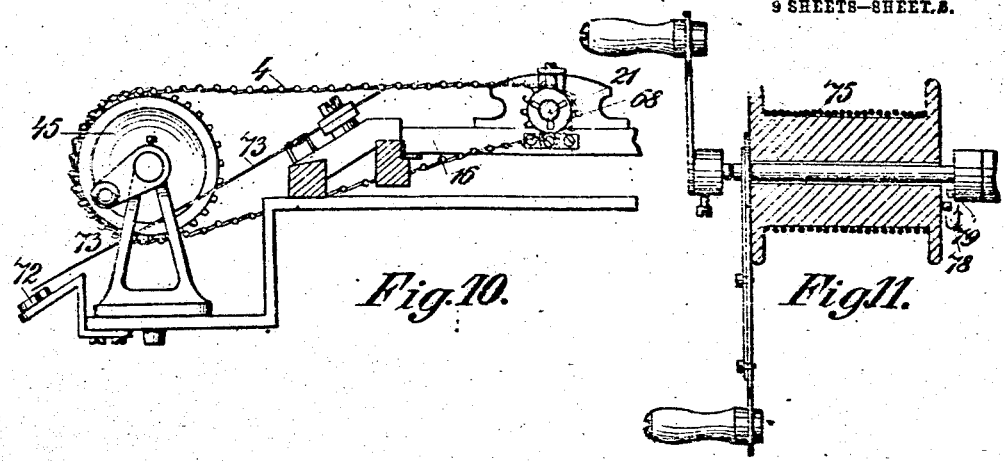
Figure 12:
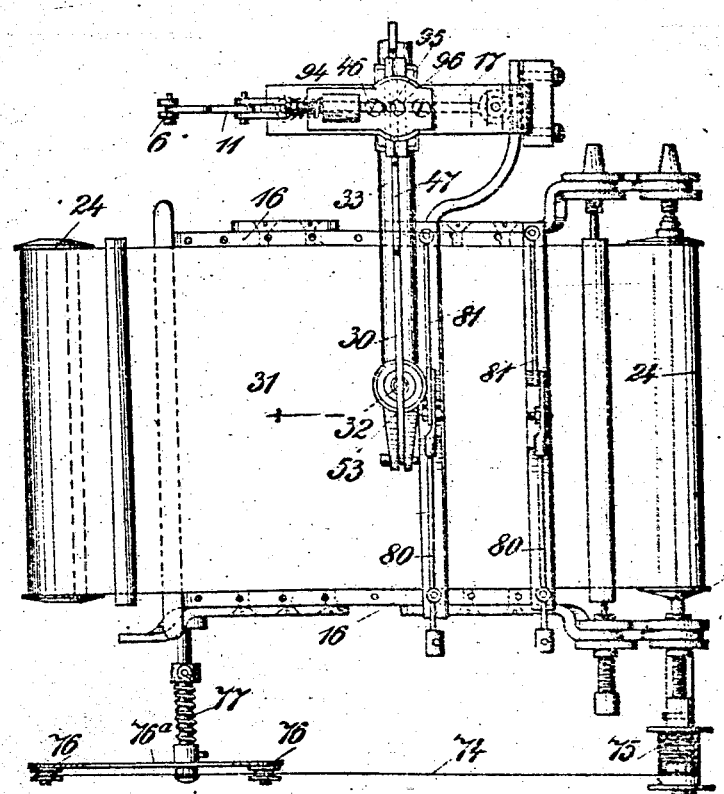
Figure 13:
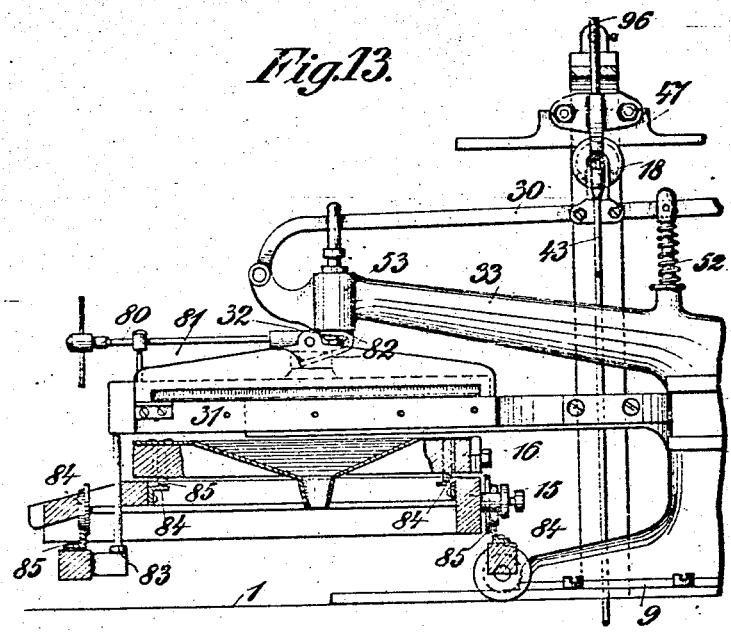
Figure 14:
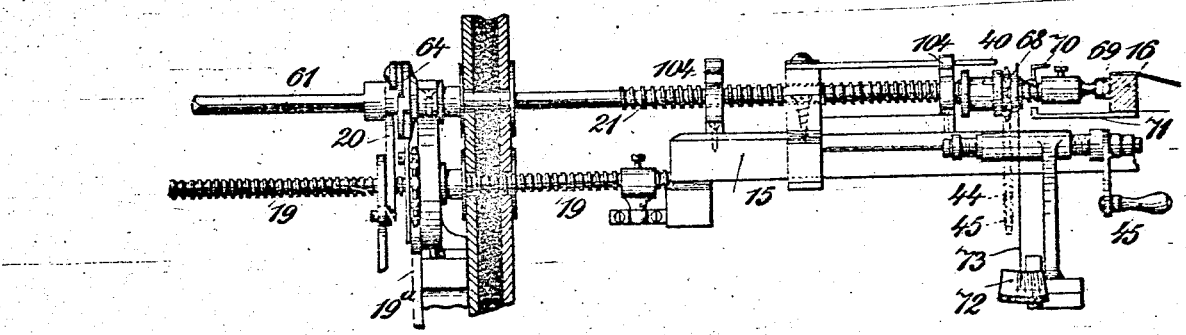
Figure 16:
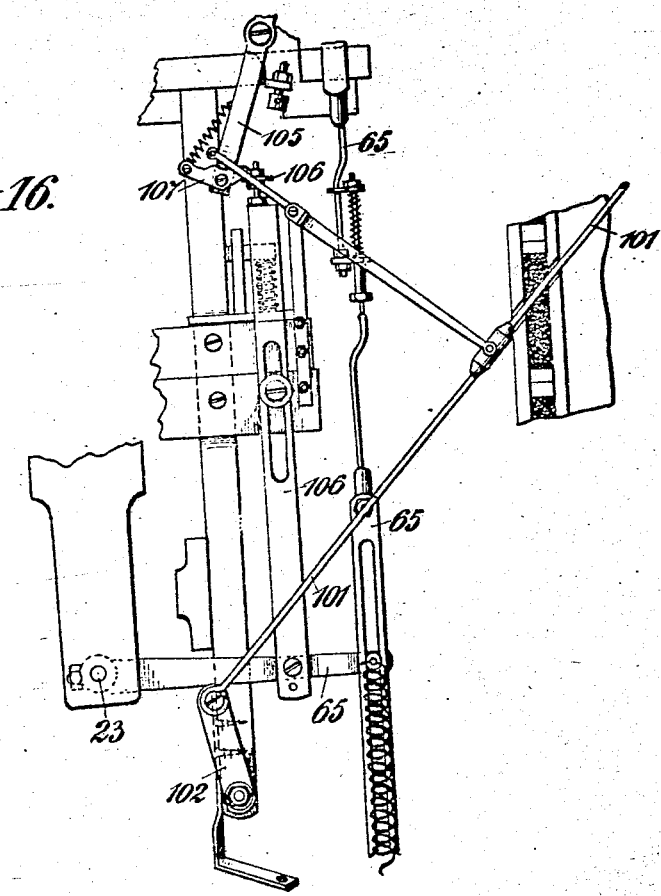
Figure 18:
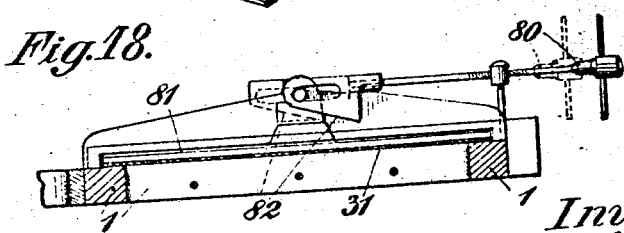

Figure 1 shows a perspective view of the apparatus. Fig. 2 shows a perspective side view of the same with the removal of its cover. Fig. 3 shows a side view of the apparatus opened, the slide moving device in particular being shown in its initial position or before commencing the movement. Fig. 4 is a partial ground plan of the note-punching machine, the two slides however having been removed for the purpose of more clearly showing the punch and combination of rods for the adjustment of said punch, as well as the combination of rods connecting the slide to the indicating device. Fig. 5 shows the connection of the adjusting rods to the slide of the punching device on an enlarged scale. Fig. 6 shows in front elevation the device for actuating the punch as well as the device for arresting the punch. Fig. 7 is the corresponding side elevation and showing also the connections to the foot lever. Fig. 8 is a partial view of a scale arranged over the keyboard and indicating the time or measure divisions into ½, ¼, ⅛ etc. Fig. 9 represents a scale for triplets for indicating tripartite sound or measure divisions. Fig. 10 shows the arrangement of the hand wheel for time or measure division. Fig. 11 represents one of the two stretching rollers which, being actuated by constant spring tension, maintain the paper band at a proper tension. Fig. 12 represents a ground plan of the frame over which the paper band is kept at proper tension while at its ends winding and stretching rollers are arranged for the purpose of, on the one part, unwinding the paper strip and, on the other part, winding it, the second pair of cylinders which, in regard to its shape and arrangement, accurately corresponds with the cylinders represented, being however merely slightly indicated. Fig. 13 represents a side view with partial section through Fig. 12. Fig. 14 shows in front elevation the device for moving the slide, those parts of the machine which are arranged in front of this device being, however, omitted. Fig. 15 shows the slide moving device represented in Fig. 3 in its final position, i. e. after the slide has been pushed forward. Fig. 16 shows the arresting device for the principal driving shaft after its motion is arrested. Fig. 17 is a detail view, to an enlarged scale, of the device for keeping the paper properly stretched. Fig. 18 is a detail elevation of a clamping device hereinafter more fully described.

Referring, firstly, to the means for adjusting the punching device in its working position, this adjusting device is arranged on working-table 1, on which at the same time the keyboard is arranged in a suitable manner and the sheet of music (so-called copy) to be employed arranged. A pointer or index which indicates the note to be punched moves across this keyboard. This pointer or index 4 is connected to a hand lever 36 (Figs. 1 and 4), which is adjustable and exposed to the action of spring 5 in such a way that by displacing it by means of an adjustable displacing rod 35, (Fig. 4), which is jointed at 7 to crank lever 34, this crank lever being pivoted at 8 in such a way that it can oscillate, and the intended adjustment of punch 32 crosswise to the direction of paper strip 31 is brought about. The punching device is mounted on the slide 9, which slide 9 is adjustably connected at 10 by a pivotal joint to a displacing rod 12 (Fig. 5) which on its part is likewise made adjustable (Figs. 4 and 5).

The direction in which the adjustable crank lever 34 and punching device 32 move are at an angle of 90° to each other, i. e. while the movement of said adjustable crank lever 34 is from right to left, i. e. in the same direction in which the paper band moves and parallel to it, the movement of punch 32 takes place at a right angle to the direction in which paper band 31 moves.

The conversion of the right and left movement of the adjustable crank lever 34 into the to and fro movement of the punch 32 is obtained by means of any suitable jointed angle-rod combination whereby the to and fro movement of the punching device on slide 9 can be adjusted to the punching position.

The punch 32 by which the slits are to be punched in the longitudinal direction of paper band 31, is arranged above said band in an adjustable bearing bracket and arm 33 perpendicular to the direction in which paper band 31 moves. In order to be able to produce by means of this punch 32 a longitudinal slit whose length at the same time indicates the length of the corresponding note, the paper band 31 opposite the punch 32 is displaced to a corresponding extent in such a way that the minimum displacement at the same time represents the shortest note to be reproduced, say $\frac{1}{32}$ of a note. Each note of greater length requires a corresponding multiple of the smallest note. For instance, half a tone would require 16 such displacements, while a full tone would require 32 displacements. If I wish to satisfy even further demands as to the length of tone, I soon perceive that this can only be done by dividing a full measure into 96 parts, in such a way that a slit in the paper strip corresponding to a full measure would have to be obtained by 96 individual displacements opposite the punch. This displacement of paper strip 31 cannot however be of a lasting nature, because at a given adjustment punch 32 can only invariably punch a certain tone, so that the strip must be brought back to the commencement of the stroke of the punch if other tones of the measure are to be produced by displacement of punch 32 perpendicular to the direction in which paper strip 31 moves. Not until all the tones belonging to a measure have been punched is paper strip 31 definitely displaced in order to produce the subsequent measure.

A further part of the machine consists of the device for actuating the punch 32 which has been placed in its working position as described hereinabove by the adjusting crank lever 34, for the purpose of cutting (by means of punching knives) notes of different values. The same part further consists of a device for obtaining, every time the punch 32 goes up or recedes into its position of rest, simultaneously, the advance of paper band 31 by jerks or steps, so that the punch 32 on going down again makes the following individual cut, corresponding to the diameter of the punch, in the paper band. Consequently the individual values of notes are cut in the paper in conformity with the copy arranged on the working table, in a continuous straight line, corresponding to the movement of the paper band, while the width of such notes is in conformity with the diameter of the punch. This double motion, namely the up and down movement of punch 32 and the simultaneous advance of paper strip 31, is brought about by the main shaft 23 (Figs. 6 and 7)

arranged underneath the machine in a way similar to a chain beam but only able to turn through a certain angle. This main shaft is operated by a foot lever 22 (Figs. 2 and 7).

From the driving shaft 23 a frame 43 is moved up and down by means of levers and rods 49 combined with which is a spring 49' for the purpose of elastic working (Figs. 6 and 7). This frame 43 is secured on machine frame 1 and works in a second fixed hoop-like guide or frame 17. This frame 43 carries at its top a rail 47 placed perpendicular to the plane of motion, against which rail the punching lever 30 provided with a guiding shaft and roller 18 is pressed by means of a spring 52, in such a way that on the frame 43 going downwards the spring 52 is compressed and the punch 32 moved downwards and caused to produce its effect upon the paper. The spring 52 as well as punching lever 30, are carried by an arm 33 (Fig. 7) having formed therewith a boss 53 through which the punch 32 moves up and down. This bearing arm 33 rests at its bottom part on the slide 9 (Figs. 4 and 13) guided between two rails; which slide 9, by means of the rod combination 34 and 35, can, according to requirements, be displaced transversely to the longitudinal direction of the paper band 31 without the starting device of the frame 43 being thereby interfered with.

In addition to the purpose of the roller 18 hereinabove described, which consists in that said roller, by the movement of the driving shaft 23, lever rod combination 49 and guide rail 47, actuates the lever 30 and thereby the punching knife 32, thus resulting in the punching operation, the same roller 18 further serves to guide the lever 30 in through a perpendicular plane.

The rollers 24, 24 whereon the paper winds and unwinds itself are mounted in bearings on the upper or "value" slide 16; the paper 31 running over these rollers being kept in tension by means of a number of tension rollers 75, 76, 77 and the tension cord 74. The upper slide 16 moves by means of rollers 84' over the lower or "time or measure" slide 15 but is at first rigidly connected therewith by the nuts 104, Fig. 14, which engage at one end with the screw spindle 21 of the upper slide 16 and on the other end are mounted on the lower slide 15 is such manner that they cannot be displaced. The slide 15 can be displaced in the longitudinal direction along the table of the apparatus by means of the screw spindle 19 which can be moved by means of a nut which is rotatably mounted in the frame of the apparatus and by means of the chain 19ᵃ can be actuated by the hand wheel 55.

In order to arrange the paper in its proper working position it is in the first instance adjusted by means of the hand wheel 45 (Figs. 1 and 10) in such relative time or measure position as is required for the note or the note band. This time or measure position is the initial position occupied by the punch 32 at the time when the punching of a cut for a note is to be commenced. For the purpose of indicating the position of the slide 15 two or three scales 56, 57, (Figs. 1, 4, 8 and 9) are arranged on working table 1. One of these scales shows the division of the measure into 1, ½, ¼, ⅛, 1/16, 1/32 and 1/64 while the other scale 57 fixes the same values in triplets. It is also possible to arrange a third scale for intermediate values, such as fifths, sevenths, ninths, tenths, etc.

The division of the time or measure on the scales is produced by pairs of indicators or pointers 58, 58', and 59, 59', (Fig. 4), guided on the sides of the scales.

60 (Fig. 4) is an indicator or pointer for a third scale which may be arranged if desired for fifths, etc.

The mechanical device required for placing the paper band 31 in its initial position consists of a slide, the so-called lower or "time or measure" slide 15 (Figs. 1 and 14), which can be adjusted by hand by means of an adjusting wheel, 55, chain 19ᵃ and spindle 19, in accordance with the scale and in such a way that its movement is strictly controlled, the movement of this slide 15 being transmitted by means of rod combination 62 and 63 (Figs. 1 and 4) to the indicator scales 56 and 57. At the same time the paper 31 is by this means placed in its right position in order to be brought under the influence of the punching knife.

In addition to the lower, or time or measure slide referred to, the machine possesses an upper slide 16 (Figs. 1 and 14), the so-called "value slide", whose task is to advance by jerks or steps the paper band adjustment and guided by the time or measure slide 15 in conformity with the upward movement of the punch 32 to punch the slits.

The mechanical device by which this movement by jerks or steps is obtained consists mainly of a spindle 21 (Figs. 1 and 14), that part of the spindle which faces the slide being provided with a screw thread, while the rest of the spindle is given the shape of a square 61 (Fig. 14), for the purpose of being turned by means of a ratchet sheave 64 belonging to ratchet gear 20 (Figs. 2, 3, 14 and 15).

Every time the spindle 21 is actuated an angle of 120° is performed, or in other words it receives a third of a complete revolution.

Ratchet sheave 64, which is secured by means of wedges on spindle 21 (Figs. 2, 3, 14 and 15) is actuated by main shaft 23 together with punch 32 by means of foot lever 22 to the extent of 120° at a time. This rotation is performed by means of main shaft 23 with the assistance of lever rod connection 65. The top part of this rod connection is pivotally connected to the transporting or arresting lever 20, which rests on and pivots round spindle 19, the upper arm of this lever catching on ratchet sheave 64.

The upper arm of lever 20 carries a trip 67, and the thumb or dent 20ᵃ of this trip catches on corresponding contact surfaces formed on the transporting sheave 64 and turns said sheave 64 every time main shaft 23 is operated to the extent of 120°, the movement of this sheave being transmitted by it to the upper slide 16. The toothed sheave 64, (Fig. 3) is moreover provided with ratchet mechanism 105, 109, the pawl 109 of which is continuously pressed by means of the spiral spring 108 against the rear half of the periphery of the toothed wheel 64. This half of the wheel, like the other half, is provided with three teeth with the difference however, that the latter teeth are arranged in the opposite direction to the former.

By means of the connecting rod 106 which is actuated in a vertical direction from the main shaft 23 the ratchet gear 105, 109 is periodically caused to come out of engagement with the toothed wheel 64 by means of the spring mounted stop 107. The ratchet gear 105, 109 causes the toothed wheel 64 when acted upon by the lever 20 to rotate to the extent of exactly 120°. At the lower end of the arm 105 there is pivoted a projection 107 which can swing upwards on the pivot 107′ but is prevented from swinging downwards, a connecting rod 106 is vertically movable up and down by means of the rock shaft 23 through the arm 65′ in the path of the projection 107. While moving upwards the connecting rod 106 swings the projection 107 round its pivot 107′ by means of an adjustable head 106′ which on its downward travel engages with the projection 107 and thereby releases the lever 105 and with it the detent 109. The upper slide or "value slide" 16 is actuated by the spindle 21 (Figs. 1 and 14) and transport and ratchet gear 20 and 64, said spindle or mandrel 21 being screwed backwards and forwards in the nuts 104 which are rigidly mounted on the lower slide 15. The lower slide or "time or measure slide" 15 is moved by means of chain 19ᵃ and chain wheel 55, and after a time or measure has been completely punched, is placed in its new position. The upper slide or value slide 16, which is impelled by mandrel 21, is displaced proportionately to the value of the note to be punched; the displacement in question being obtained by pressing upward and downward foot lever 22, which actuates the shaft 23 (Figs. 6 and 7) and whose movement is transmitted to the ratchet gear 20 (Figs. 2, 3, 15 and 16) above referred to. By this means the spindle 21 is turned every time foot lever 22 is pressed downwards to a given angle, and the frame 16 connected to this spindle is displaced a distance which corresponds to the shortest interval. The return of the upper slide 16 into its initial position upon the lower slide 15 is effected by hand by means of the hand wheel 45, (Figs. 1, 10 and 16) the chain 44, and the nut 40, which latter is mounted above the lower slide 15 so as to be capable of rotation but not of longitudinal movement, see Fig. 14; said chain 44 transmitting its motion to a small chain wheel 68. This small chain wheel 68 is mounted on the spindle 21 of upper slide 16 and turns together therewith; said chain wheel 68 thus effects the return of the upper slide, which is thus by hand brought back into its initial position. The upper mandrel 21 is at 69 secured on the front of the upper slide 16, and a contact pin 70 arranged on the front of said slide 16 arrests this slide on reaching its final position, while a second pin 71 (Fig. 14) adjusts or moves the indicator pointer 73 over the scale 72 to its zero position.

The paper is stretched so to be given the necessary tension required for punching in the usual manner by means of suitable stretching cord 74 (Fig. 12) which, starting from a roller 75, is passed over guide rollers 76, said guide rollers being carried by a pivoted lever 76ᵃ under the action of a spring 77 to a second roller 75′ (Fig. 1). The spiral spring 77 (Figs. 12 and 17) arranged on the spindle of the lever 76ᵃ serves the purpose of moving the rollers 76 in the direction of the arrow and of putting the wire 74 under tension, and thus stretching the paper strip tightly over the drums 24.

The rollers 75, 75′ are arranged merely for the purpose of preventing the paper from being torn during the punching operation. The details of one of the stretching rollers 75 is shown in Fig. 11 to an enlarged scale, and in order to stretch the paper 31 the following method is used:

In consequence of the direction in which the pulling takes place, the rollers 75, 75′ being under the influence of the stretching cord 74, will turn the paper cylinders and their supporting spindles away from each other, as indicated by the arrow in Fig. 17.

The roller 75 is provided on that side which faces the paper cylinder 24 (Fig. 11) with a catch 78 and this catch, during the rotation, strikes against a contact pin 79 arranged on the axle of the paper cylinder, thus tending to turn said paper cylinder in the opposite direction to that which it takes when unraveling the paper band 31, whereby the paper band is always kept stretched.

To enable the paper band 31 to be moved forward under the punch to the extent of a bar and to be unwound from one of the rollers 24 and to be wound around the other after a whole bar has been completed, the time or measure slide 15 is moved to the extent of a bar while said paper band 31 is held firmly by means of the clamping device 80, 81, attached to the frame of the apparatus. This is effected by means of rod combination 80 (Figs. 12, 13 and 18) furnished with inclined clamps 82 which on engaging ratchets on clamps 81 force latter down so as to firmly grip the paper band 31 and thus it is made possible to return by handle 55 the time or measure slide 15 into its initial position. These clamping plates 81 are returned to their initial position in any convenient manner. For the purpose of producing this result the clamping device 81 and 82 is independent of the two slides 15 and 16 and secured at 83 (Fig. 13) to the frame of the working table. Slides 15 and 16 move by means of rollers 84, 84' (Fig. 13) on suitable guide rails 85', 85, respectively.

In order to count the number of perforations punched, a counting device 86 of the usual construction is arranged, being actuated from the main shaft 23, as it is necessary to ascertain for each note the accurate number of punchings, in order to obtain a right length of cuts or the proper value of the note.

In order to transmit to the paper strip 31, which is rigidly connected with the upper slide 16, in accordance with the composition of notes submitted, a time or measure consisting of several notes, and possibly also of several chords, the punch 32 is adjusted with the assistance of hand lever 36 to the first note (for instance a half note), whereupon the machine is started by means of foot lever 22. Punch 32 now punches a slit in the paper strip, which is simultaneously advanced with the assistance of spindle 21 and slide 16, the length of the slit thus produced being perfectly correct provided the counting device 86 indicates the necessary number of lifts (for instance 48). After the note has been punched, and provided the time or measure contains no further note, either higher or lower, the counting apparatus at the same time being automatically brought back to zero. Before the machine is, however, restarted, paper band 31 is returned by means of gear 44 and 45, and by means of the screw mechanism 40, 21 to the commencement of the time or measure, the upper slide 16 is moved back to its initial position on the lower slide 15 which meanwhile remains stationary. If the next note does not commence with the commencement of the measure, or if the first note is followed by a note of the same pitch after a comparatively short interval, it is necessary to advance paper band 31 with the assistance of spindle 21, a certain number of smallest intervals and consequently an equal number of lifts of the lever 22, the punch 32 being thrown out of gear. This throwing out of gear is effected by a very simple manner by hand by means of the rod 6 (Figs. 1, 6, 12 and 13) and pin 46, the latter of which arrests the upper guide rod 47 of the frame 43 in its highest position by engaging with the notch 95 in the upper guide pin 96 on the frame 43. This is rendered possible by providing an elastic connection 49' between the rods 43 and 49 by means of a spring, and the lower rod connection 65 (Fig. 7), said spring connection 49' allowing the foot lever 22 to be moved without affecting the punch 32. In this manner each note of a measure can be placed in its accurate position on the paper band. After the completion of the bar the clamping device 80, 81, which is mounted on the inside of the frame of the apparatus at 83, holds the paper 31 in position, whereupon the upper and lower slides 16, 15, are together moved back to the extent of a bar, while the paper 31 is held back relatively to the frame of the apparatus, the paper winding and unwinding itself on the rollers 24 in the meantime to the extent of a bar. When this operation has been effected the clamping device connected with the frame at 83 is released, so that the paper 31 can by means of the lower slide 15 be brought into the correct initial position for punching the first note of the next bar. To enable the punch 32 after having made the perforation again to assume the position for punching, the lever rod 65 is weighed in a suitable manner with a weight 100 as will be clearly understood from Fig. 7. A second clamping device 80, 81 may be carried by the arm 33 as a further security.

For the purpose of throwing the machine out of gear, a hand lever 101, Figs. 2, 3 and 16 laterally arranged on the machine, is used, as, on this lever being pulled, a lever 102 will disengage rod combination 65 from the main shaft 23 as will be clear on reference to Figs. 3 and 16.

I claim:

1. An apparatus of the character described, comprising spring actuated rollers to hold a strip under tension, a frame on which said rollers are mounted movable to and fro, a lower frame likewise movable upon which the first named frame is movable the lower frame being movable forward through a certain distance only upon the completion of a bar of music for the purpose of starting a new bar of music.

2. An apparatus of the character described having a reciprocating frame upon which is carried the strip to be punched, means for moving said strip in accordance with the length of the note comprising a shaft 23, a treadle 22, screw spindle 21, ratchet mechanism to rotate said spindle, punch 32 operatively connected to the shaft 23, the ratchet mechanism being adjustable always somewhat in advance of the corresponding downward movement of the pawl 32; the apparatus being thus caused to work very slowly so as to avoid any risk of the tearing of the strip.

3. An apparatus of the character described comprising the upper reciprocating frame 16 upon which is carried the sheet to be punched, means for moving said frame, a screw spindle, a link mechanism by which the said spindle is rotated, a counting mechanism operatively connected to the means for moving the frame and which counting mechanism automatically returns to zero when a new note is to be punched and which is provided with a scale from which the displacement of the upper frame 16 can be read off.

4. An apparatus for punching music sheets, comprising paper punching and feeding mechanism, separate movable frames 15, 16 on which said mechanisms are respectively mounted, means including pawl, and ratchet mechanism for moving said frames, a nut 40 carried by the frame 16, a screw spindle 21 on which said nut is mounted, means for operating said spindle and means whereby the nut may be disengaged from the frame 16 and the latter returned to its initial position.

5. In an apparatus for punching sheets the combination with movable sheet supporting devices of a horizontally movable punch supporting arm, a punch carried by said arm, a lever pivotally mounted on said arm and connected to said punch, a vertically movable frame, a horizontal arm carried by said frame and adapted to contact with said lever and thereby actuate the punch.

6. In an apparatus for punching music sheets, the combination with movable sheet supporting devices and means for moving the same, of a horizontally movable punch supporting arm, a punch carried by said arm, a key board, a handle 36 adjacent to the key board, and mechanism arranged between the punch and key board whereby the position of the punch may be ascertained and manually controlled, substantially as described.

In testimony whereof I have hereunto set my hand in presence of two subscribing witnesses.

JULIUS CARL BUNGE.

Witnesses:
HENDRIK VON BEECH VOLLERHOVE,
AUGUST SIEGFRIED DOCEN.